No. 672,704. Patented Apr. 23, 1901.
W. J. HALL.
DUMPING WAGON.
(Application filed Aug. 7, 1900.)
(No Model.) 2 Sheets—Sheet 2.
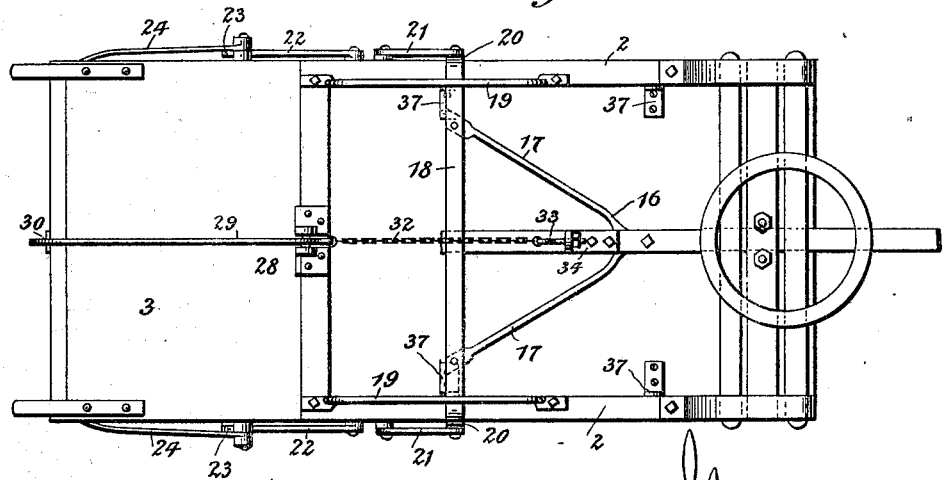
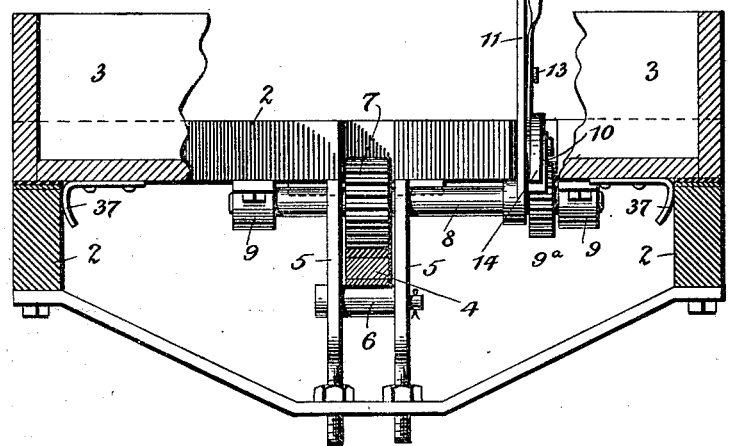
Witnesses: Inventor,
William J. Hall,
By J. R. Littell,
His Attorney.

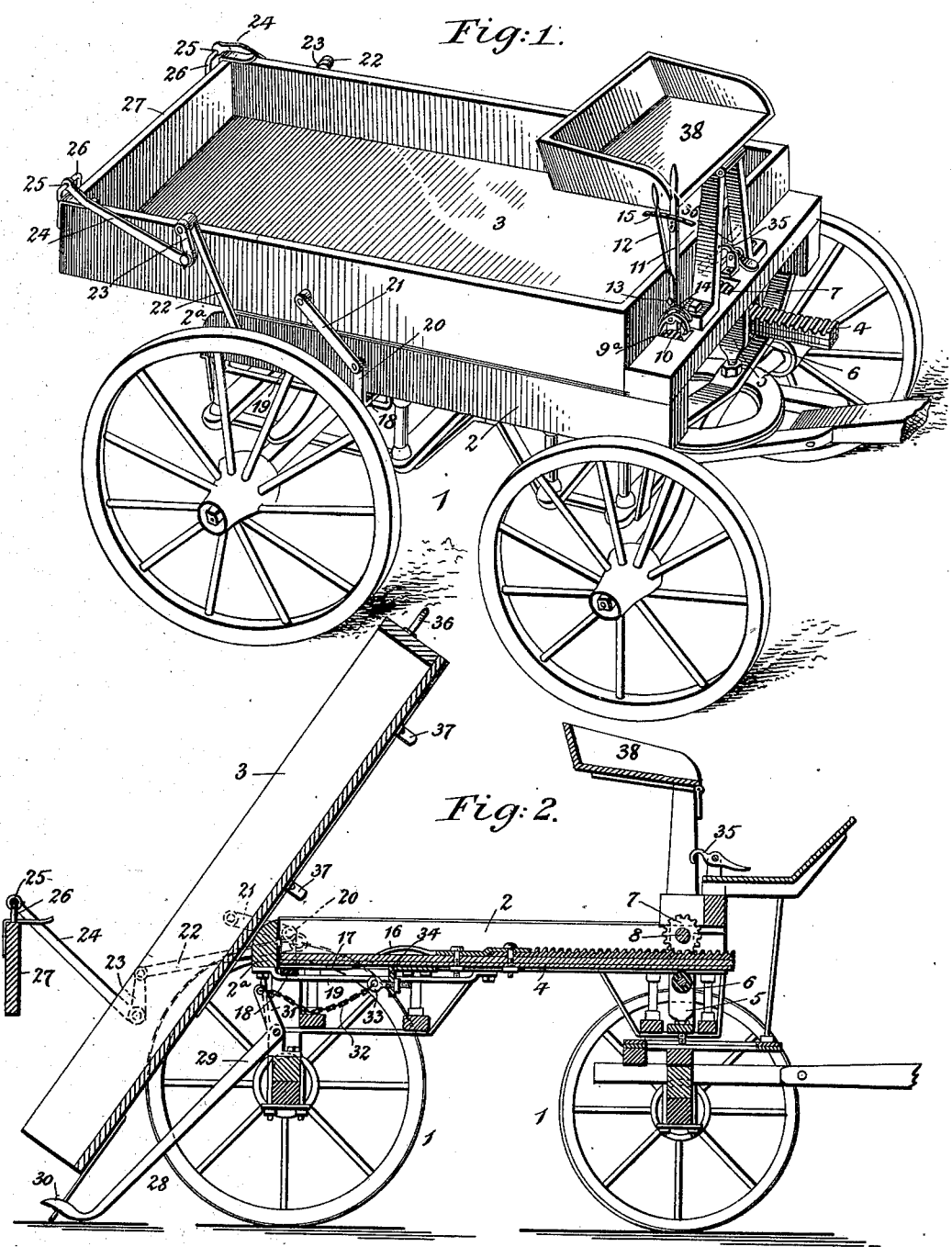

UNITED STATES PATENT OFFICE.

WILLIAM J. HALL, OF NEW YORK, N. Y.

DUMPING-WAGON.

SPECIFICATION forming part of Letters Patent No. 672,704, dated April 23, 1901.

Application filed August 7, 1900. Serial No. 26,116. (No model.)

*To all whom it may concern:*

Be it known that I, WILLIAM J. HALL, a citizen of the United States, residing at New York, in the county and State of New York, have invented certain new and useful Improvements in Dumping-Wagons, of which the following is a specification.

This invention relates to dumping wagons or carts; and it has for its objects to simplify the operating mechanism and to so arrange the various parts that the wagon or cart may be dumped and the tail-board coincidently and automatically raised and lowered without the necessity of the driver leaving his seat.

My invention consists of the novel features of construction and arrangement of parts, all of which will be hereinafter fully described, and particularly pointed out in the claims.

In the drawings, Figure 1 is a perspective view of a dumping wagon or cart constructed according to my invention, the parts being shown in normal position. Fig. 2 is a central longitudinal section thereof, showing the wagon or cart in dumped position. Fig. 3 is an inverted plan of Fig. 1, the running-gear being omitted. Fig. 4 is a transverse section, on an enlarged scale, taken near the forward end of the wagon or cart, a part of the front board being broken away. Fig. 5 is a side detail view of the lever devices for actuating the operating mechanism.

Corresponding reference characters indicate corresponding parts in all figures of the drawings.

Referring to the drawings, 1 designates the running-gear, which may be of any desired or approved pattern, and upon which is mounted and securely fastened a frame 2, the latter serving as a support for the body portion of the wagon or cart 3, which may also be of any desired construction.

4 designates a rack which moves between guide-bars 5, secured to the forward end of the frame 2, said rack resting upon a roller 6, disposed between said guide-bars 5 and serving to assist in the easy travel of the rack, as well as to keep its teeth in positive engagement with the teeth of a gear-wheel 7, which latter is secured to a shaft 8, arranged transversely of the frame 2 and supported in bearings 9, as shown clearly in Fig. 4. Upon the shaft 8 is also mounted a gear-wheel $9^a$, the teeth of which are engaged by the teeth of a double pawl 10, pivotally secured to a lever 11, the latter being loosely mounted upon the shaft 8, so that by a movement thereof in one direction or the other the shaft 8 will be rotated and through the gear-wheel 7 move the rack, the direction of travel being controlled by the pawl 10, as will be hereinafter described.

12 designates a lever which is pivoted to the lever 11 at 13, the lower bifurcated spring end 14 of said lever 12 being adapted to embrace the double pawl 10, while its upper extremity is adapted to engage recesses in a segment 15 on the lever 11. Thus when the lever 12 is moved upon its pivot to the left, as shown clearly in Figs. 1 and 4, the left leg of the bifurcated spring end 14 will bear upon that side of the pawl 10 to bring one of its teeth into engagement with the gear-wheel 9, while its other tooth will be released, and vice versa.

16 designates a forked brace-rod which is secured to the rack 4, its arms 17 being secured to a bar 18, arranged transversely of the frame 2, said bar being adapted to travel in guides 19, located one at each side of the frame 2, and having its extremities upturned, as at 20, at which point they are pivoted to links 21, which in turn are pivoted to the sides of the body portion 3 of the wagon or cart, as shown clearly in Figs. 1, 2, and 3. Thus when the rack is moved to dump the wagon the body portion 3 will be moved rearwardly through the connections just described until the center shall have passed the end rail $2^a$ of the frame 2, when it will cant over, as shown clearly in Fig. 2.

22 designates arms pivotally secured to each side of the frame 2, near the rear end thereof, the outer extremities of which are pivoted to one arm of bell-crank levers 23, which in turn are pivotally secured to the body portion 3 of the wagon or cart. The opposite arms 24 of the bell-crank levers 23 are provided with perforations 25, through which staples or other suitable devices 26 pass, said staples being secured to the tail-board 27, so that when the mechanism is moved to dump the wagon the arms 22 will move the bell-crank levers 23 to automatically raise the tail-board to the position shown in Fig. 2.

In order to lock the tail-board against displacement when the wagon or cart is in its normal position, I provide a locking device 28 at the rear end of the frame 2, said locking device consisting of a bell-crank lever 29, pivotally supported under the frame 2 in any suitable manner, the outer free end of which is provided with a finger 30, adapted to engage the tail-board when the latter closes down upon the body portion 3, as in Figs. 1 and 3. The other arm 31 of the bell-crank lever 29 is secured by a chain 32 to a screw-eye 33 or other suitable fastening device, which is adjustably held in a bracket 34, secured to the rack 4. Thus when the rack is moved forward to return the body portion 3 of the wagon to normal position the bell-crank lever 29 through the chain 32 (which quickly becomes taut) will be moved on its pivot so as to bring the finger 30 thereon up into engagement with the tail-board, where it will remain until a reverse movement of the rack takes place, when it will again automatically fall by gravity into the position shown in Fig. 2.

35 designates a latch pivotally secured to the forward end of the frame 2, said latch being provided with a hooked end adapted to engage a strap or projection 36, secured to and projecting from the body portion 3 of the wagon, by which engagement unnecessary strain is removed from the rack 4, gear-wheel 7, and their adjuncts previously described, when the wagon is in normal position and the body portion 3 is in addition locked against accidental rearward movement.

37 designates fingers or guide-plates secured to the under side of the body portion 3 and projecting downwardly therefrom, so as to engage the inner surfaces of the side rails of the frame 2, and thus prevent any lateral movement of the body portion while it is being moved on the frame 2, as will be understood.

It will be observed from the foregoing that the construction and arrangement of the several parts are such that they are not liable to be easily gotten out of order and that the operating-levers are so positioned with respect to the driver's seat 38 that the driver is enabled to dump the wagon without the necessity of dismounting therefrom and to again return it to normal position by simply reversing the pawl 10, as previously described.

It will also be observed that when the wagon is in its dumped position, as shown in Fig. 2, the end of the rack 4 will bear against the inner face of the end rail 2ª of the frame 2, which will have the effect of relieving the teeth on the rack, the gear 7, and its adjuncts from all strain while in that position.

It will also be observed that by means of the improved construction and relative arrangement as embodied in my invention as hereinabove described by one operation three movements are simultaneously and automatically effected—to wit, the wagon-body is dumped, the tail-board is unlocked, and the tail-board is raised or opened. Likewise in returning the wagon-body to normal position only one operation is necessary to accomplish simultaneously and automatically the return of the wagon-body, the lowering or closing of the tail-board, and the locking of the tail-board in normal position.

It will be apparent that my invention provides in a simple, inexpensive, and effective manner a dumping-wagon that is particularly well adapted for the purposes intended and one that is strong and durable in every respect and that can be easily and quickly operated.

Manifest modifications may be made—such, for instance, as applying the same to a two-wheeled cart—and other changes may be readily made. I therefore reserve the right to make any such changes and alterations as come within the spirit and scope of my invention and the terms of the following claims.

Having thus described my invention, I claim and desire to secure by Letters Patent—

1. A dumping wagon or cart, comprising a dumping body portion, a rack supported beneath said body portion and having a transversely-projecting bar secured thereto, links pivoted to said bar and to the sides of the body portion, a gear-wheel intermeshing with the teeth of said rack, and means for operating said gear-wheel whereby the parts are moved to operate said body portion.

2. A dumping wagon or cart, comprising a dumping body portion, a rack supported and moving beneath said body portion, and loosely connected therewith, gear-wheels adjacent said rack and with one of which the teeth of said rack engage, a lever adjacent the other of said gear-wheels, and a pawl adapted to engage the teeth of said gear-wheel, whereby the latter is moved in one direction or the other to operate the parts to dump or return said body portion.

3. A dumping wagon or cart, comprising a dumping body portion, a frame beneath said body portion and upon which the latter rests, a locking device adapted to hold the body portion in raised or returned position, a rack moving in guideways secured to said frame, gear-wheels adjacent said rack and with one of which the teeth of said rack engage, a lever adjacent the other of said gear-wheels, and means adapted to engage the teeth of and move said gear-wheel, whereby the parts may be operated to dump or return the body portion.

4. A dumping wagon or cart, comprising a dumping body portion, a frame supporting the same, means supported by and moving upon said frame for operating the dumping body portion, a movable tail-board carried by the dumping body portion, and operative connections between the frame and the tail-board whereby the tail-board is raised during the dumping movement of the body portion.

5. A dumping wagon or cart, comprising a dumping body portion, a frame supporting the same, means supported by and moving upon said frame for operating the dumping body portion, a movable tail-board carried by the dumping body portion, operative connections between the frame and the tail-board whereby the tail-board is raised during the dumping movement of the body portion, and a locking device for said tail-board carried by the frame and arranged to be disengaged from the tail-board during the dumping movement of the body portion.

6. A dumping wagon or cart, comprising a dumping body portion, an open frame supporting the same, fingers or guide-plates secured to the under side of said body portion and adapted to engage the inner faces of the side rails of said frame to prevent lateral displacement of said body portion, a rack supported and moving in said frame and loosely connected with said body portion, means for moving said rack, arms pivoted to said frame and to bell-crank levers pivotally secured to the sides of the body portion, the other arms of said bell-crank levers being loosely secured to the tail-board, and a locking device for engaging and disengaging the tail-board as the wagon is dumped or returned.

7. A dumping wagon or cart, comprising a dumping body portion, a frame upon which said body portion moves, a rack supported by said frame, pivotal connections between said body portion and rack, means for moving said rack whereby the said pivotal connections are moved to dump or return said body portion to its normal position, arms pivoted to said frame, bell-crank levers pivoted to said arms and to the tail-board whereby the latter is raised or lowered simultaneously with the movement of the body portion, a locking-lever adapted to lock said tail-board in closed position, and a loose connection between said locking-lever and the rack whereby when the latter is moved to dump the body portion said locking-lever will fall by gravity out of engagement with the tail-board.

8. A dumping wagon or cart, comprising a dumping body portion, a frame beneath said body portion and upon which the latter moves, a rack supported by said frame, pivotal connections between said rack and body portion, means for moving said rack whereby said body portion is dumped and returned to its normal position, arms pivoted to said frame and to bell-crank levers, the latter being pivoted to the body portion and to the tail-board whereby the latter is raised or lowered simultaneously with the movement of the body portion, and means for automatically locking said tail-board in closed position.

9. A dumping wagon or cart, comprising a dumping body portion, a frame beneath said body portion and upon which the latter moves, a rack supported by said frame, pivotal connections between said rack and body portion, means for moving said rack whereby said body portion is dumped, and arms pivoted to said frame and to bell-crank levers pivoted to the body portion and to the tail-board, whereby the latter is raised simultaneously with the dumping of the body portion.

10. A dumping wagon or cart, comprising a dumping body portion, a frame beneath said body portion and upon which the latter moves, a rack supported by said frame, pivotal connections between said rack and body portion, means engaging said rack whereby it is operated to move said body portion to dump and return it to its normal position, and means connecting with the frame and tail-board, whereby the latter is positively and simultaneously raised and lowered by the movement of the body portion.

11. A dumping wagon or cart, comprising a dumping body portion, a rack supported and moving beneath said body portion and loosely connected therewith, gear-wheels adjacent said rack and with one of which the teeth of said rack engage, a lever adjacent the other of said gear-wheels, an adjustable pawl device carried by the lever and whereby the respective gear-wheel is moved in one direction or the other to operate the parts to dump or return said body portion, and means carried by the lever for locking the adjustable pawl device in one or the other operative position.

12. A dumping wagon or cart, comprising a dumping body portion, a frame supporting the same, means supported by and moving upon said frame for operating the dumping body portion, an adjustable tail-board carried by the body portion, and a locking device for directly engaging and disengaging the tail-board as the body portion is dumped or returned, said locking device being operatively connected with the means for operating the dumping body portion.

13. A dumping wagon or cart, comprising a dumping body portion, a frame supporting the same, means supported by and moving upon said frame for operating the dumping body portion, an adjustable tail-board carried by the body portion, and a locking device for directly engaging and disengaging the tail-board as the wagon is dumped or returned, said locking device embodying a pivoted gravity-finger in operative connection with the means for operating the dumping body portion.

14. A dumping wagon or cart, comprising a dumping body portion provided with a detachable tail-board, a frame beneath said body portion and upon which the latter moves, means for moving said body portion to dump the same, means connecting with the frame and with the tail-board whereby the tail-board is positively raised by and simultaneously with the movement of the body portion, and a locking device for directly engaging and disengaging the tail-board as the body portion is dumped or returned, said locking device being operatively connected with the means for moving the body portion.

In testimony whereof I have signed my name in the presence of the subscribing witnesses.

WILLIAM J. HALL.

Witnesses:
J. R. LITTELL,
J. M. HOCTOR.